16,767,721
Patented Oct. 23, 1973

3,767,721
PROCESS FOR ISOMERIZING AROMATIC HYDROCARBONS
Takeshi Sonoda and Katsuo Sugai, Kamakura, Japan, assignors to Toray Industries, Inc., Tokyo, Japan
No Drawing. Filed Dec. 8, 1971, Ser. No. 206,120
Int. Cl. C07c 5/24
U.S. Cl. 260—668 A                   6 Claims

ABSTRACT OF THE DISCLOSURE

This invention relates to a process for isomerizing an aromatic hydrocarbon, especially an alkyl benzene having more than two carbon atoms in its alkyl substituents on benzene nuclei. More specifically, this invention relates to a process for isomerizing an alkyl benzene utilizing a novel catalyst composition containing partially dealkalized mordenite and platinum-alumina component as its essential ingredient.

DESCRIPTION OF THE PRIOR ART

Heretofore, a process has been disclosed for isomerizing an alkyl aromatic hydrocarbon utilizing a catalyst containing crystalline aluminosilicate such as the mordenite form. This appears, for example, in U.S. Pat. No. 3,409,686. However, this conventional process is not satisfactory in respect to the recovery ratio attainable in the alkyl aromatic hydrocarbon.

The catalyst composition used in this known process has an excellent catalytic activity for isomerizing the alkyl aromatic hydrocarbon, but it is not adequate in its selectivity.

Therefore, an object of this invention is to provide an enhanced process for isomerizing alkyl aromatic hydrocarbons, utilizing a novel and excellent catalyst. Another object of this invention is to provide a novel catalyst usable for conversion of alkyl aromatic hydrocarbons to form more useful isomerized products in high yield.

SUMMARY OF THE INVENTION

We have now found that an alkyl aromatic hydrocarbon can be isomerized in extremely high yield by contacting the alkyl aromatic hydrocarbon at elevated temperature and pressure with a catalyst composition comprising (a) about 80 to about 20% by weight of a platinum alumina component wherein about 0.1 to about 3.0 parts by weight of platinum are supported on about 100 parts by weight of a solid consisting essentially of an alumina, and (b) about 20 to about 80% by weight of a partially dealkalized mordenite form crystalline aluminosilicate which contains 0.1 to about 0.9, preferably about 0.3 to about 0.9, more preferably about 0.5 to about 0.9, equivalent of alkali or alkaline earth metal per gram atom of aluminum forming the ion-exchanging sites therein, said crystalline aluminosilicate having more than about 60 milli-equivalents per 100 g. of a cation-exchanging capacity, and said components (a) and (b) being finely divided and thoroughly dispersed in each other.

DESCRIPTION OF THE PREFERRED EMBODIMENTS

The mordenite form crystalline aluminosilicate used as a component of the catalyst composition in this invention can be a natural or synethtic crystalline aluminosilicate which has essentially the same X-ray diffraction spectrum as shown in A.S.T.M. Specification 6–0239, for example. As an example of such a synthetic aluminosilicate, "Zeoron" produced by Norton Co. of the United States is commercially available. The aluminosilicate preferably contains enough mordenite to have more than about 60 meq./100 g. of cation-exchange capacity. The mordenite form aluminosilicate used in the present invention must be partially dealkalized at a specific ratio. The partial dealkalization can be carried out according to conventional ion-exchange methods, and the amount of alkali or alkaline earth metal contained in the mordenite form aluinosilicate is reduced to 0.1 to about 0.9, preferably about 0.3 to about 0.9, more preferably about 0.5 to about 0.9, equivalent per gram atom of aluminium forming the ion-exchanging sites therein. The limitation of 0.1 equivalent is a critical limitation. When they are reduced to less than 0.1 equivalent, unpreferably side reactions such as cracking and disproportionation reactions occur in the process of this invention, and therefore the yields of useful products decrease. When the mordenite form aluminosilicate contains more than about 0.9 equivalent of alkali or alkaline earth metal, the reaction rate becomes too low and thermodynamic equilibrium cannot be practically obtained.

The partial dealkalization of the mordenite form crystalline aluminosilicate can be conducted by using well-known methods; for example by contacting the crystalline aluminosilicate with an aqueous solution of organic or inorganic acids or various kinds of ammonium salts, thereby displacing a part of the alkali or alkaline earth metal contained in the crystalline aluminosilicate by a proton or an ammonium ion.

In the dealkalization of the crystalline aluminosilicate inorganic acids such as hydrochloric acid or nitric acid, or organic acids such as oxalic acid or acetic acid are usually used. As ammonium salts, water soluble ones such as ammonium chloride, ammonium nitrate and ammonium carbonate, etc. are preferably used.

The partial dealkalization treatment of mordenite can be carried out at substantially any convenient temperature ranging from about room temperature up to about 200° C., but usually at a temperature from about 70° C. to about 110° C.

The time of the treatment is variable depending upon the temperature, the concentration of the treating solution, the kind of acids or ammonium salts and the size of the crystalline aluminosilicate, but is usually in the range of about 5 minutes to about 48 hours.

When a dilute solution is used in the dealkalization treatment, it is usually repeated more than twice.

The degree of dealkalization of the aluminosilicate has critical importance in the present invention and it can be controlled by varying the concentration of the aqueous solution of acids or ammonium salts. The degree of dealkalization can be determined by means of a conventional elemental analysis or fluorescence X-ray analysis, etc.

The partially dealkalized crystalline aluminosilicate is washed with water to remove the remaining acids or ammonium salts, and thereafter dried. When the dealkalization is carried out using an aqueous ammonium salt, the dealkalized mordenite aluminosilicate is preferably calcined at a temperature of from 400 to 900° C. in order to eliminate ammonium ions.

When natural crystalline aluminosilicates are partially dealkalized in the form of relatively large masses, it is necessary to pulverize them to form small particles which are of such a size as to be suitable for usage as catalysts. The partially dealkalized mordenite can be prepared by displacing a specific portion of proton or ammonium ion of a completely dealkalized crystalline aluminosilicate, a hydrogen form aluminosilicate, by displacement with an alkali metal or with an alkaline earth metal.

In this invention the partially dealkalized aluminosilicate can further contain copper, silver, chromium, iron or a small amount of manganese or lantanide series metals without substantial effect upon the properties of the catalyst composition.

These extra metals can be incorporated into the partially dealkalized aluminosilicate by conventional methods such as ion-exchange, or precipitation and impregnation.

Another component of the catalyst composition used in the process of this invention is referred to herein as a platinum-alumina component wherein about 0.1 to about 3.0 parts by weight of platinum are supported on about 100 parts by weight of a solid consisting essentially of alumina.

The platinum-alumina component has been well-known per se as a catalyst for conversion of hydrocarbons, and can be prepared by conventional methods. Suitable examples of the methods include drying an alumina gel impregnated with a solution of chloroplantinic acid, adding impregnating a chlorine-containing alumina gel prepared by mixing aqueous ammonia with an aqueous solution of aluminum chloride with an aqueous solution of chloroplatinic acid and thereafter introducing hydrogen sulfide gas into the mixture prepared above, adding a water soluble platinum amine complex salt to an alumina gel containing a fluorine compound, and adding a mixture of fluoroboric acid and chloroplatinic acid to an alumina gel can. The platinum-alumina component may further contain a small amount of rhenium or palladium metal.

The partially dealkalized aluminosilicate and the platinum-alumina component both of which are finely pulverized, are dry-blended with each other and thereafter shaped into pellets having a suitable size for usage as a catalyst. The weight ratio of these components is from about 20:80 to about 80:20. The pellets are then calcined at a temperature of about 300 to about 700° C.

The pellets thus obtained are used as a catalyst composition in the process of this invention. The alkyl aromatic hydrocarbons are contacted with the catalyst composition at an elevated temperature and pressure, generally in a gaseous state.

The alkyl aromatic hydrocarbons which can be fed into the process of the present invention are alkyl benzenes having about 2 to about 4 carbon atoms in the alkyl substituents of its benzene nuclei. For example, the alkyl benzenes include ortho-xylene, meta-xylene, para-xylene, ethylbenzene, ortho-ethyltoluene, meta-ethyltoluene, para-ethyltoluene, trimethyl benzenes, diethyl benzenes, tetramethyl benzenes, etc. and mixtures thereof.

In the process of this invention the presence of other non-aromatic hydrocarbons, such as naphthenes and paraffin, for example, do not inhibit the isomerization reaction of these alkyl benzenes.

The process of the present invention can be most effectively applied to a mixture of xylenes also containing ethylbenzene. According to this invention such a mixture can be converted effectively to a thermodynamic equilibrium mixture of xylenes in high yield; para-xylene or ortho-xylene, both of which have large industrial utility, can be obtained by separating them from the mixture.

The reaction conditions of the process of this invention are variable depending upon the kind of alkyl aromatic hydrocarbons to be fed into the reaction zone, but the reaction temperature is generally about 200 to about 600° C. and the reaction pressure is about 5 to about 100 atmospheres.

In the process of this invention the time factor of the reaction $W/F$ (g.-cat. hr./g. mol of starting material, wherein W represents the weight of catalyst and F represents moles of alkyl aromatic hydrocarbon being fed into the reaction zone per hour) is not particularly limited. If one intends to attain a high conversion in the process of this invention, the time factor is preferably arranged in the range of from about 5 to about 200, specifically from about 20 to about 100.

In the present invention the reaction is preferably carried out in the presence of hydrogen which prevents the deposit of carbon on the catalyst composition; the catalytic life of the catalyst composition is thereby extended.

The amount of hydrogen is not particularly limited, but is generally less than about 50 moles, preferably about 2 to about 20 moles, per mole of hydrocarbon.

The following examples are given to illustrate the process of this invention. However, they are not intended to limit the scope of the present invention, which is defined in the claims.

It is important to observe that in the foregoing specification and in the claims reference has been made to a composition "comprising" about 20% to about 80% of a partially dealkylized mordenite form crystalline aluminosilicate. Naturally occurring mordenite normally contains a major proportion of amorphous form, and it is to be understood that this invention includes the use of the naturally occurring materials, so long as they contain at least a majority of the crystalline form, which is the active form for the purposes of this invention, and the word "comprising" in the claims should be construed accordingly.

EXAMPLE 1

(1) 500 grams of naturally occurring mordenite having a cation-exchange capacity of 148 meq./100 g. and a silica-to-alumina ratio of 9.8 and a composition of (Na, 0.50; K, 0.32; Mg, 0.04; Ca, 0.49) $O \cdot Al_2O_3 \cdot 9.8SiO_2$ was subjected once to ion-exchange treatment at 95° C. for four hours using one liter of a 0.25 N aqueous solution of ammonium chloride. After drying at 150° C. for 24 hours, the resulting mordenite was calcined for 18 hours at 520° C. to form a catalyst component designated as component M (0.81). This M (0.81) included 0.81 equivalent of alkali metal ions and alkaline earth metal ions per gram atom of aluminum forming an ion-exchange site.

(2) Components M (0.70) and M (0.50) were prepared by treating the same mordenite material using 0.375 N and 0.75 N aqueous solutions of ammonium chloride respectively in the same manner as described above.

(3) As a comparative example, component M (0.05) was prepared by treating four times (for four hours each time) using a 2.0 N aqueous solution of ammonium chloride in the same manner as described above.

(4) As a comparative example, the same mordenite was calcined for 18 hours at 520° C. without subjecting it to any treatment. The resulting products were designated as component M (0.94).

(5) M (0.81) obtained in (1) above was further subjected to ion-exchange treatment using an aqueous 5 wt. percent solution of copper nitrate, an aqueous 2 wt. percent solution of silver nitrate, an aqueous 5 weight percent solution of chromium nitrate and an aqueous 5 wt. percent solution of ferric nitrate respectively and thereby a part of the alkali and alkaline earth metal were removed. The resultant mordenite aluminosilicates contained 0.68, 0.62, 0.65 and 0.62 equivalent respectively of alkali metal and alkaline earth metal ions per gram-atom of aluminum. These were designated as component CuM (0.68), AgM (0.62), CrM (0.65) and FeM (0.62) respectively.

(6) Powder of synthetic mordenite having an ion-exchange capacity of 220 meq./100 g. and a silica-alumina ratio of 10.5 and having the formula (Na, 1.92; K, 0.06; Ca, 0.01) $O \cdot Al_2O_3 \cdot 10.5SiO_2$ was treated with a 0.40 N aqueous solution of ammonium nitrate at 80° C. for two hours.

The partially dealkalized mordenite aluminosilicate thus obtained contained 0.61 equivalent of alkali metal ion and alkaline earth metal ion per gram atom of aluminum forming an ion-exchange site. This was designated as component SM (0.61).

(7) As a comparative example, component SM (0.04) was prepared by treating the same synthetic mordenite four times (for four hours each time) using a 2.0 N aqueous solution of ammonium nitrate in the same manner as described above.

EXAMPLE 2

(1) 1000 grams of alumina powder consisting substantially of eta alumina together with a minor proportion of gamma alumina, was placed in a steam jacketed rotating vessel and 1500 ml. of an impregnation solution containing 20.0 grams $H_2PtCl_6 \cdot 6H_2O$ (about 37% platinum) was added thereto.

The vessel was rotated until all the liquid solution was evaporated. After drying at 150° C. for 24 hours, the resulting catalyst component contained metallic platinum in an amount of 0.75% by weight. This was designated as component PTA (0.75).

(2) Components PTA (0.54), PTA (0.42) and PTA (0.375) were prepared by treating the same alumina in the same manner as described above. These PTA's contained metallic platinum in an amount of 0.54%, 0.42% and 0.375% by weight respectively.

(3) As a comparative example, component PTM (0.375) was prepared by treating the ammonium type mordenite M (0.70) which was obtained in Example 1 in the same manner as described above.

EXAMPLE 3

Mechanically mixed catalysts comprising a mixture of partially dealkalized mordenite and platinum on alumina were prepared as follows:

The finely divided particles of mordenite components obtained in Example 1 and alumina components obtained in Example 2 were thoroughly mixed using a ratio shown in the following Table 1. Then, the mixture was moulded into pellets having a size of 1.5 mm. x 2 mm. $\phi$ and calcined for 16 hours at 500° C. These resulting catalysts are shown in the following Table 1.

TABLE 1

Composition (wt. percent)

Catalyst:
- A (control) -- 50% M (0.94)+50% PTA (0.75).
- B ---------- 50% M (0.70)+50% PTA (0.75).
- C ---------- 50% M (0.50)+50% PTA (0.75).
- D (control) -- 50% M (0.05)+50% PTA (0.75).
- E (control) -- 100% PTM (0.375).
- F (control) -- 100% PTA (0.375).
- G ---------- 50% CuM (0.68)+50% PTA (0.75).
- H ---------- 50% AgM (0.62)+50% PTA (0.75).
- J ---------- 50% CrM (0.65)+50% PTA (0.75).
- K ---------- 50% FeM (0.62)+50% PTA (0.75).
- L ---------- 50% SM (0.61)+50% PTA (0.75).
- M ---------- 30% SM (0.61)+70% PTA (0.54).
- N ---------- 30% SM (0.38)+70% PTA (0.54).
- P (control) -- 10% SM (0.04)+90% PTA (0.42).

EXAMPLE 4

Using 10.0 grams of catalysts A, B, C and D prepared in Example 3, ethylbenzene was introduced into an isomerization chamber at a flow rate of 21.5 g./hour, and isomerized at a temperature of 410° C., and at a pressure of 13 kg./cm.² Hydrogen was introduced at a flow rate of 29 N-liter/hour. The results obtained are shown in Table 2.

TABLE 2

| | Catalyst | | | |
|---|---|---|---|---|
| | A (control) | B | C | D (control) |
| Reaction products, mol. percent: | | | | |
| $C_7$- naphthene plus paraffin* | 0.3 | 0.6 | 1.4 | 12.8 |
| $C_8$+ naphthene plus paraffin | 7.4 | 9.8 | 10.5 | 8.0 |
| Benzene | 0.2 | 0.4 | 0.6 | 6.5 |
| Toluene | 0.1 | 0.3 | 0.4 | 4.8 |
| Ethylbenzene | 82.4 | 51.4 | 43.4 | 20.3 |
| p-Xylene | 2.3 | 8.9 | 10.5 | 9.0 |
| m-Xylene | 4.9 | 19.8 | 22.0 | 18.8 |
| o-Xylene | 2.1 | 8.1 | 10.0 | 8.6 |
| $C_9$+ | 0.3 | 0.7 | 1.1 | 11.2 |
| $C_8$ recovery, mol. percent | 99.1 | 98.0 | 96.4 | 64.7 |
| Xylene recovery, mol percent | 9.3 | 36.8 | 42.5 | 36.4 |

*"$C_7$- naphthene plus paraffin" is calculated in terms of $C_8$ hydrocarbon, then the value of the "$C_7$- naphthene plus paraffin" is given by the following equation:
$$1/8\ C_1 + 2/8\ C_2 + 3/8\ C_3 + 4/8\ C_4 + 5/8\ C_5 + 6/8\ C_6+ + 7/8\ C_7$$

EXAMPLE 5 (COMPARATIVE)

Using 10.0 grams of catalyst E and F prepared in Example 3, the reaction was performed in the same way under the same conditions as set forth in Example 4. The results obtained are shown in Table 3.

TABLE 3

| | Catalyst | |
|---|---|---|
| | E (control) | F (control) |
| Reaction products, mol. percent: | | |
| $C_7$- naphthene plus paraffin | 0.8 | 0.2 |
| $C_8$ naphthene plus paraffin | 6.7 | 5.4 |
| Benzene | 1.3 | 0.3 |
| Toluene | 0.2 | 0.1 |
| Ethylbenzene | 86.8 | 93.4 |
| p-Xylene | 0.7 | 0.1 |
| m-Xylene | 1.5 | 0.2 |
| o-Xylene | 0.6 | 0.1 |
| $C_9$+ aromatics | 1.4 | 0.2 |
| $C_8$ recovery, mol percent | 96.3 | 99.2 |
| Xylene recovery, mol percent | 2.8 | 0.4 |

EXAMPLE 6

Using 10.0 grams of catalysts B, C, D and F prepared in Example 3, ortho-xylene was introduced at a flow rate 21.5 g./hour, and isomerized at a temperature of 410° C. and at a pressure of 13 kg./cm.² Hydrogen was introduced at a flow rate of 29 N-liters/hour. The results obtained are shown in Table 4.

TABLE 4

| | Catalyst | | | |
|---|---|---|---|---|
| | B | C | D (control) | F (control) |
| Reaction products, mol. percent: | | | | |
| $C_7$- naphthene plus paraffin | 0.3 | 0.2 | 3.2 | 0.1 |
| $C_8$ naphthene plus paraffin | 4.9 | 7.1 | 6.6 | 2.8 |
| Benzene | 0.1 | 0.2 | 1.1 | 0.1 |
| Toluene | 0.3 | 0.4 | 11.8 | 0.3 |
| Ethylbenzene | 1.8 | 3.4 | 3.5 | 0.1 |
| p-Xylene | 16.4 | 17.4 | 14.2 | 0.4 |
| m-Xylene | 42.3 | 44.0 | 34.1 | 1.5 |
| o-Xylene | 33.6 | 26.8 | 14.7 | 94.6 |
| $C_9$+ aromatics | 0.4 | 0.5 | 10.8 | 0.1 |
| $C_8$ recovery, mol. percent | 99.0 | 98.7 | 73.1 | 99.4 |
| Concentration of p-xylene in the recovered xylenes, percent | 17.8 | 19.7 | 22.5 | 0.4 |

EXAMPLE 7

Using 10.0 grams of catalysts G, H, J and K prepared in Example 3, the reaction was performed in the same way under the same conditions as set forth in Example 4. The results obtained are shown in Table 5.

TABLE 5

| Reaction products. mol. percent: | Catalyst | | | |
|---|---|---|---|---|
| | G | H | J | K |
| C7- naphthene plus paraffin | 1.3 | 2.3 | 1.2 | 2.1 |
| C8 naphthene plus paraffin | 9.6 | 9.2 | 9.4 | 8.8 |
| Benzene | 1.1 | 1.3 | 0.8 | 1.6 |
| Toluene | 0.6 | 0.5 | 0.3 | 0.8 |
| Ethylbenzene | 54.0 | 38.9 | 45.8 | 49.1 |
| p-Xylene | 7.9 | 11.3 | 10.2 | 8.8 |
| m-Xylene | 17.0 | 23.9 | 21.5 | 19.4 |
| o-Xylene | 7.5 | 10.9 | 9.9 | 8.2 |
| C9+ aromatics | 1.0 | 1.7 | 0.9 | 1.2 |
| C8 recovery, mol. percent | 96.0 | 94.2 | 96.8 | 94.3 |
| Xylene recovery, mol. percent | 32.4 | 46.1 | 41.6 | 36.4 |

EXAMPLE 8

Using 10.0 grams of catalyst C prepared in Example 3, a charge stock as shown in the following Table 6 was introduced into an isomerization chamber at a flow rate of 30.7 g./hour, and isomerized at a temperature of 415° C. and at a pressure of 12.6 kg./cm.$^2$. Hydrogen was introduced at a flow rate of 40 N-liter/hour. The results obtained are shown in Table 6.

TABLE 6

| | Charge stock | Product |
|---|---|---|
| C7- naphthene plus paraffin | | 1.10 |
| C8 naphthene plus paraffin | 7.99 | 7.67 |
| Benzene | 0.01 | 0.16 |
| Toluene | 1.89 | 2.21 |
| Ethylbenzene | 14.90 | 10.42 |
| p-Xylene | 2.32 | 16.87 |
| m-Xylene | 53.01 | 41.79 |
| o-Xylene | 19.88 | 19.32 |
| C9+ aromatics | | 0.46 |
| C8 recovery, mol. percent | | 97.93 |
| Xylene recovery, mol. percent | | 103.68 |
| Concentration of p-Xylene in xylenes, percent | 3.08 | 21.63 |

EXAMPLE 9

Using 10.0 grams of catalysts L, M, N and P prepared as in Example 3, the reaction was performed in the same way under the same conditions as set forth in Example 4. The results obtained are shown in Table 7.

TABLE 7

| | Catalyst | | | |
|---|---|---|---|---|
| | L | M | N | P (control) |
| Reaction products, mol. percent: | | | | |
| C7- naphthene plus paraffin | 1.2 | 0.9 | 1.5 | 1.1 |
| C8 naphthene plus paraffin | 8.9 | 9.5 | 9.2 | 7.3 |
| Benzene | 0.9 | 0.5 | 1.2 | 2.5 |
| Toluene | 0.3 | 0.2 | 0.4 | 0.2 |
| Ethylbenzene | 50.7 | 59.3 | 50.2 | 60.3 |
| p-Xylene | 9.0 | 7.1 | 8.8 | 6.4 |
| m-Xylene | 19.1 | 14.9 | 18.8 | .36 |
| o-Xylene | 8.8 | 6.9 | 8.5 | 6.2 |
| C9+ aromatics | 1.1 | 0.7 | 1.4 | 2.4 |
| C8 recovery, mol. percent | 96.5 | 97.7 | 95.5 | 93.8 |
| Xylene recovery, mol. percent | 36.9 | 28.9 | 36.1 | 26.2 |

The following is claimed:

1. A process for isomerizing an alkyl benzene having about 2 to about 4 carbon atoms in its alkyl substituents on the benzene nucleus, which process comprises contacting the alkyl benzene in a reaction zone with a catalyst composition comprising (a) about 80 to about 20% by weight, based on the total weight of the catalyst composition, of a platinum-alumino component wherein about 0.1 to about 3.0 parts by weight of platinum are supported on about 100 parts by weight of a solid consisting essentially of an alumina and (b) about 20 to about 80% by weight of a partially dealkalized mordenite form crystalline aluminosilicate containing about 0.1 to about 0.9 equivalent of a metal selected from the group consisting of alkali and alkaline earth metals per gram atom of aluminum forming the ion-exchanging sites thereof, and said mordenite form crystalline aluminosilicate having more than about 60 milliequivalents per 100 g. of a cation-exchange capacity, and said components (a) and (b) being finely divided and thoroughly dispersed in each other.

2. The process of claim 1 wherein said isomerization reaction is carried out in the presence of hydrogen gas.

3. The process of claim 1 wherein the mordenite form crystalline aluminosilicate contains about 0.3 to about 0.9 equivalent of metal selected from the group consisting of alkali metal and alkaline earth metal per gram atom of aluminium forming the ion-exchanging sites therein.

4. The process of claim 1 wherein the mordenite form crystalline aluminosilicate contains about 0.5 to about 0.9 equivalent of metal selected from the group consisting of alkali metal and alkaline earth metal per gram atom of aluminium forming the ion-exchanging sites therein.

5. The process of claim 1 wherein the mordenite form crystalline aluminosilicate is partially dealkalized by contacting it with an aqueous solution of a dealkalizer selected from the group consisting of an acid and an ammonium salt.

6. The process of claim 1 wherein the alkylbenzene is a mixture of xylenes containing ethylbenzene.

References Cited
UNITED STATES PATENTS 3,409,685 11/1968 Donaldson et al. 260—668 A
3,409,686 11/1968 Mitsche 260—668 A CURTIS R. DAVIS, Primary Examiner U.S. Cl. X.R.

252—455 Z